(12) United States Patent
McMaster

(10) Patent No.: US 6,295,842 B1
(45) Date of Patent: Oct. 2, 2001

(54) UNIFORM DISTRIBUTION QUENCHING OF FORMED GLASS SHEETS

(75) Inventor: Ronald A. McMaster, Perrysburg, OH (US)

(73) Assignee: Glasstech, Inc., Toledo, OH (US)

( * ) Notice: Subject to any disclaimer, the term of this patent is extended or adjusted under 35 U.S.C. 154(b) by 0 days.

(21) Appl. No.: 09/419,395

(22) Filed: Oct. 15, 1999

Related U.S. Application Data

(63) Continuation-in-part of application No. 09/176,377, filed on Oct. 21, 1998, now abandoned.

(51) Int. Cl.$^7$ ............................................. C03B 27/00
(52) U.S. Cl. ................. 65/114; 65/25.1; 65/25.2; 65/104; 65/115; 65/182.1; 65/182.2; 65/95; 65/348; 428/426; 428/543; 72/176; 72/177; 72/333; 72/370.27; 72/379.2
(58) Field of Search ................. 65/25.1, 25.2, 65/104, 114, 115, 182.1, 182.2, 268, 348, 95; 428/426, 543; 72/176, 177, 333, 370.27, 379.2

(56) References Cited

U.S. PATENT DOCUMENTS

| | | |
|---|---|---|
| 2,078,541 | 4/1937 | Monnier . |
| 2,080,083 | 5/1937 | Magnien . |
| 3,393,062 * | 7/1968 | Hesten et al. . |
| 4,150,963 | 4/1979 | Imler . |
| 4,470,838 * | 9/1984 | McMaster et al. ............ 65/348 |
| 4,816,058 | 3/1989 | Kuster et al. . |
| 4,874,418 | 10/1989 | Kuster et al. . |
| 5,094,678 | 3/1992 | Kramer et al. . |
| 5,273,568 | 12/1993 | McMaster et al. . |
| 5,334,234 | 8/1994 | Anttonen et al. . |
| 5,647,882 | 7/1997 | Thiessen . |
| 5,846,281 | 12/1998 | Nikander et al. . |

FOREIGN PATENT DOCUMENTS 0 884 286 A2   12/1998   (EP) .

* cited by examiner

Primary Examiner—Michael Colaianni
(74) Attorney, Agent, or Firm—Brooks & Kushman P.C.

(57) ABSTRACT

A glass sheet quench unit (22) and method for quenching formed glass sheets by quench gas jets (40) that define a uniformly repeating gas jet impingement pattern (44) that is an equilateral triangular pattern providing uniformly repeating quench cells (46) distributed over the formed glass sheet to be quenched as equilateral hexagonal quench cells. The resultant product is a formed and quenched glass sheet (G) that has oppositely facing surfaces between which glass stresses are uniformly distributed. A method for making the quench unit (22) is performed by initially forming nozzle openings (38) in an elongated nozzle strip (36'), thereafter forming the nozzle strip with a curved cross section, thereafter forming the nozzle strip with a curved shape along its elongated length to provide a curved nozzle cap, subsequently securing the curved nozzle cap to planar sides (30) of an associated nozzle feed row (28), and securing the sides (30) of the nozzle feed row to a plenum housing (24).

32 Claims, 5 Drawing Sheets

UNIFORM DISTRIBUTION QUENCHING OF FORMED GLASS SHEETS

CROSS-REFERENCE TO RELATED APPLICATIONS

This application is a continuation-in-part of prior application Ser. No. 09/176,377 filed on Oct. 21, 1998 by Ronald A. McMaster under the title "Uniform Distribution Quenching Of Formed Glass Sheets" now abandoned.

TECHNICAL FIELD

This invention relates to a glass sheet quench unit, a glass sheet quench station including a pair of quench units, a method for quenching formed glass sheets, the resultant formed and quenched glass sheet, and a method for making a quench unit.

BACKGROUND ART

Quenching of formed glass sheets to provide annealing, heat strengthening and tempering has not previously provided uniform distribution of the quenching so as to provide a uniformly cooled glass sheet with consequent uniformity of the glass mechanical stresses resulting from such cooling. This is because formed glass sheets have oppositely facing curved surfaces over which conventional quench units do not provide uniform distribution of quench gas, unlike flat glass sheets over whose oppositely facing flat surfaces the quench gas has been more evenly distributed.

DISCLOSURE OF INVENTION

One object of the present invention is to provide an improved glass sheet quench unit for quenching formed glass sheets.

In carrying out the above object, a glass sheet quench unit constructed in accordance with the invention includes a plenum housing defining a quench plenum to which pressurized gas is supplied. A plurality of nozzle feed rows of the quench unit extend from the plenum housing in a spaced relationship from each other. Each nozzle feed row has a pair of generally planar sides. The planar sides of the nozzle feed rows have inner extremities mounted by the plenum housing and also have distal extremities with curved shapes along a longitudinal axis. Each nozzle feed row has an elongated nozzle cap that is curved in a direction along the longitudinal axis and is secured to the curved distal extremities of its planar sides. The curved nozzle cap of each nozzle feed row has a curved cross section along its length perpendicular to the longitudinal axis and has nozzle openings for providing quench gas jets that define a uniformly repeating gas jet impingement pattern providing uniformly repeating quench cells distributed over a formed gas sheet to be quenched to provide uniform quenching.

The glass sheet quench unit preferably has its nozzle openings providing gas jets that define an equilateral triangular gas jet impingement pattern providing equilateral hexagonal quench cells.

In the preferred construction of the glass sheet quench unit, the plenum housing has a V shape that is secured to the inner extremities of the planar sides of the nozzle feed rows. The nozzle feed rows in one embodiment have uniform widths and uniform spacings from each other, and in another embodiment, the nozzle feed rows have uniform widths and varying spacings from each other. The nozzle feed rows also can have varying heights from one row to the next row to provide quenching of glass sheets that are formed with curvature in transverse directions.

In the preferred construction, the curved cross section of the nozzle cap of each nozzle feed row has a semicircular shape and projections that extend from its semicircular shape and that are respectively secured to the distal extremities of the planar sides of the nozzle feed row. The projections of the curved nozzle caps have inner surfaces that oppose each other and are respectively secured to the distal extremities of the planar sides of the nozzle feed rows. Each nozzle feed row includes connections having alignment fasteners that secure the projections of the nozzle feed caps to the distal extremities of the planar sides of the nozzle feed rows. The connections that secure the projections of the curved nozzle caps to the distal extremities of the planar sides of the nozzle feed rows also include an adhesive.

Another object of the present invention is to provide an improved glass sheet quench station including a pair of quench units that oppose each other to quench formed glass sheets.

In carrying out the immediately preceding object, each quench unit of the quench station includes a plenum housing defining a quench plenum to which pressurized gas is supplied. Each quench unit also includes a plurality of nozzle feed rows extending from the plenum housing in a spaced relationship from each other. Each nozzle feed row has a pair of generally planar sides. The planar sides of the nozzle feed rows have inner extremities mounted by the plenum housing and also have distal extremities with curved shapes along a longitudinal axis. Each nozzle feed row has an elongated nozzle cap that is curved in a direction along the longitudinal axis and is secured to the curved distal extremities of its planar sides. The nozzle cap of each nozzle feed row has a curved cross section perpendicular to the longitudinal axis and nozzle openings for providing quench gas jets that define an equilateral triangular gas jet impingement pattern providing uniformly sized equilateral hexagonal quench cells, distributed over a formed glass sheet to be quenched to provide uniform quenching. Furthermore, the equilateral triangular gas jet impingement pattern and the hexagonal quench cells provided by both quench units are aligned with each other.

Another object of the present invention is to provide an improved method for quenching formed glass sheets.

In carrying out the immediately preceding object, the method for quenching formed glass sheets is performed by positioning a glass sheet, that has been formed from a flat shape to a curved shape along an axis, between a pair of gas quench units of a quench station with the gas quench units curved along said axis, and distributing gas jets from the pair of quench units for impingement with the formed glass sheet in a uniformly repeating pattern providing uniformly repeating quench cells distributed both along and perpendicular to said axis over the formed glass sheet to provide uniform quenching.

The method is preferably performed by distributing the gas jets over the formed glass sheet in an equilateral triangular pattern that provides uniformly sized equilateral hexagonal quench cells.

In one practice of the formed glass sheet quenching method, the gas jets are distributed from quench units having nozzle feed rows spaced uniformly from each other, while another practice of the formed glass sheet quenching method has the gas jets distributed from quench units having nozzle feed rows spaced at varying distances from each other.

The formed glass sheet quenching method as disclosed has the pair of quench units of the quench station positioned in upper and lower locations relative to each other with the formed glass sheet located vertically therebetween for the quenching in the equilateral triangular gas jet impingement patterns providing the uniformly sized hexagonal quench cells. The equilateral triangular gas jet impingement patterns and the uniformly sized equilateral hexagonal quench cells provided by both quench units are preferably aligned with each other.

The formed glass sheet quench method can be performed on a formed glass sheet that is curved in transverse directions and that is positioned between the pair of quench units with the pair of quench units distributing gas jets for impingement in the equilateral triangular patterns providing the uniformly sized equilateral hexagonal quench cells distributed over the transversely curved shape of the formed glass sheet.

In performing the formed glass sheet quench method, the quench gas jets are preferably distributed from the pair of quench units through curved nozzle caps of elongated shapes having curved cross sections and curved shapes along their lengths.

Another object of the present invention is to provide an improved glass sheet that has been formed from a flat shape to a curved shape along an axis and then quenched.

In carrying out the above object, a formed and quenched glass sheet according to the invention has oppositely facing formed surfaces between which glass stresses are uniformly distributed both along and perpendicular to said axis by quenching the glass sheet with gas jets that define a uniformly repeating impingement pattern that provides uniformly repeating quench cells distributed both along and perpendicular to said axis over the glass sheet and preferably with gas jets defining an equilateral triangular impingement pattern that provides uniformly sized equilateral hexagonal quench cells.

Another object of the present invention is to provide an improved method for making a quench unit for quenching formed glass sheets.

In carrying out the immediately preceding object, the method for making a quench unit is performed by initially forming nozzle openings in a predetermined pattern with predetermined sizes in a nozzle strip of an elongated length along a longitudinal axis. Thereafter, the nozzle strip is formed along its elongated length with a curved cross section perpendicular to the longitudinal axis. Thereafter, the nozzle strip is formed with a curved shape in a direction along the longitudinal axis to provide a curved nozzle cap. Subsequently, the nozzle cap is secured to distal extremities of planar sides of a nozzle feed row with the distal extremities having curved shapes along said longitudinal axis. Finally, the sides of the nozzle feed row are secured to a plenum housing.

In the preferred method for making a quench unit, the nozzle openings are punched in the nozzle strip, the nozzle strip is roll formed with a curved cross section along its elongated length, the nozzle strip is roll formed with the curved shape along its elongated length, the curved cross section of the nozzle strip is formed with a semicircular shape and projections that extend from its semicircular shape and that are secured to the planar sides of the nozzle feed row, alignment fasteners and adhesive secure inner surfaces of the projections of the curved nozzle cap to the planar sides of the nozzle feed row, and the sides of the nozzle feed row are secured to a V-shaped plenum housing.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
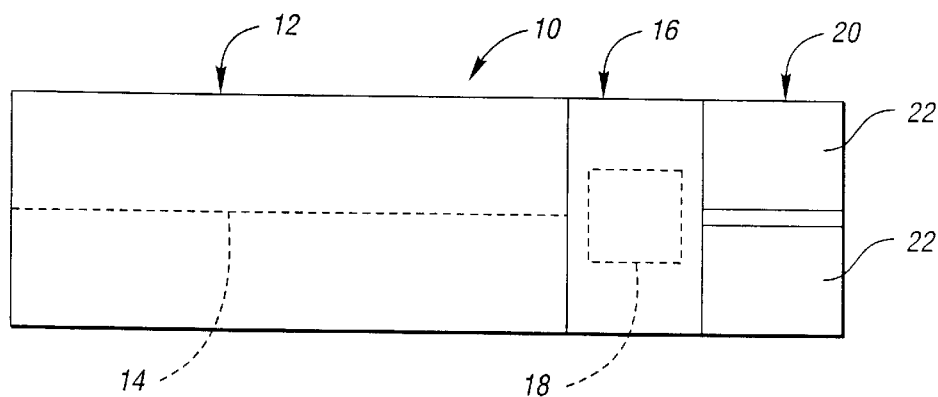
FIG. 1 is a schematic elevational view illustrating a glass sheet processing system including a quench station having quench units constructed in accordance with the present invention.

With reference to FIG. 1 of the drawings, a glass sheet processing system generally indicated by 10 includes a furnace 12 in which glass sheets are heated on a conveyor 14, a forming station 16 including bending apparatus 18 that forms the heated glass sheets, and a quench station 20 including a pair of quench units 22 constructed in accordance with the present invention to provide quenching of the formed glass sheets in a manner that is hereinafter more fully described.

Figure 2:
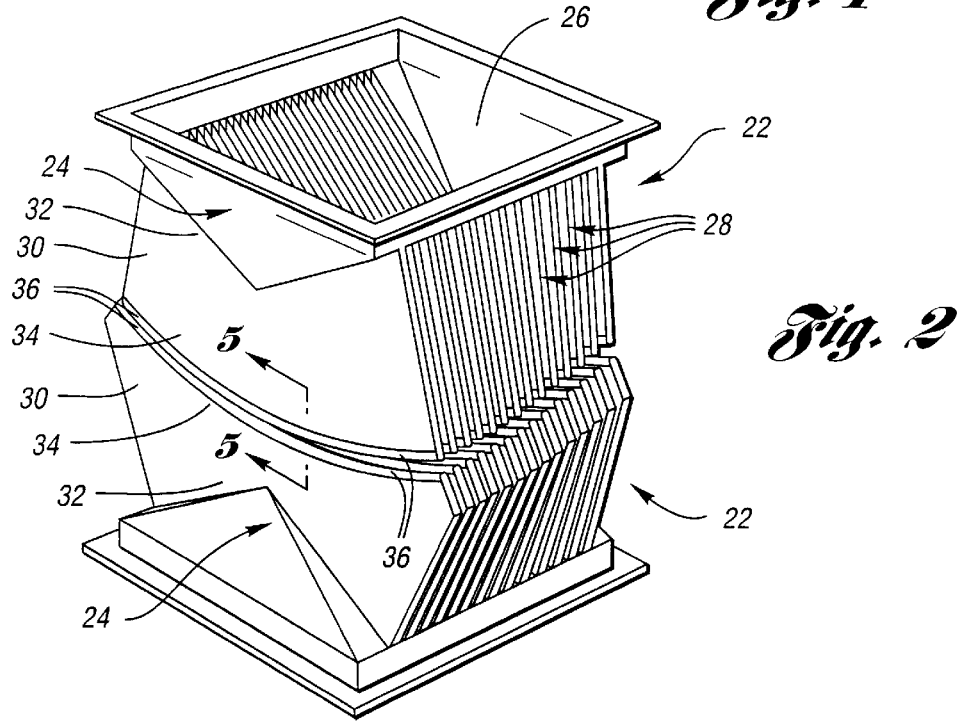
FIG. 2 is a perspective view of the pair of quench units of the invention.
Figure 3:
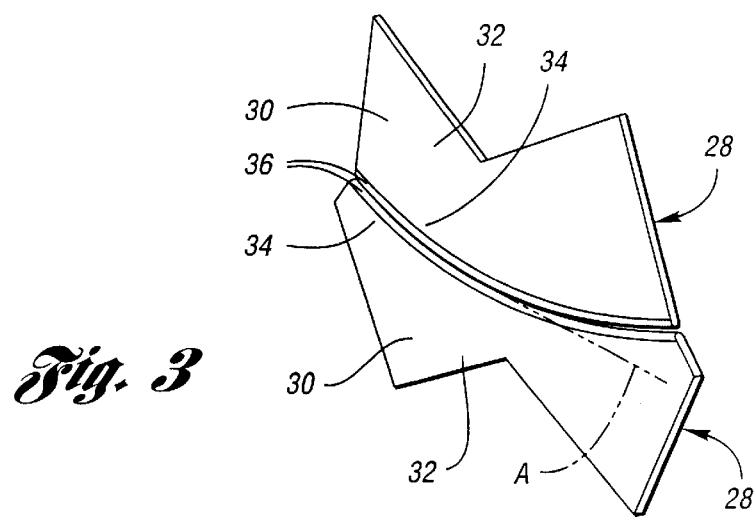
FIG. 3 is a perspective view of a cooperable pair of nozzle feed rows of the quench units.
Figure 4:
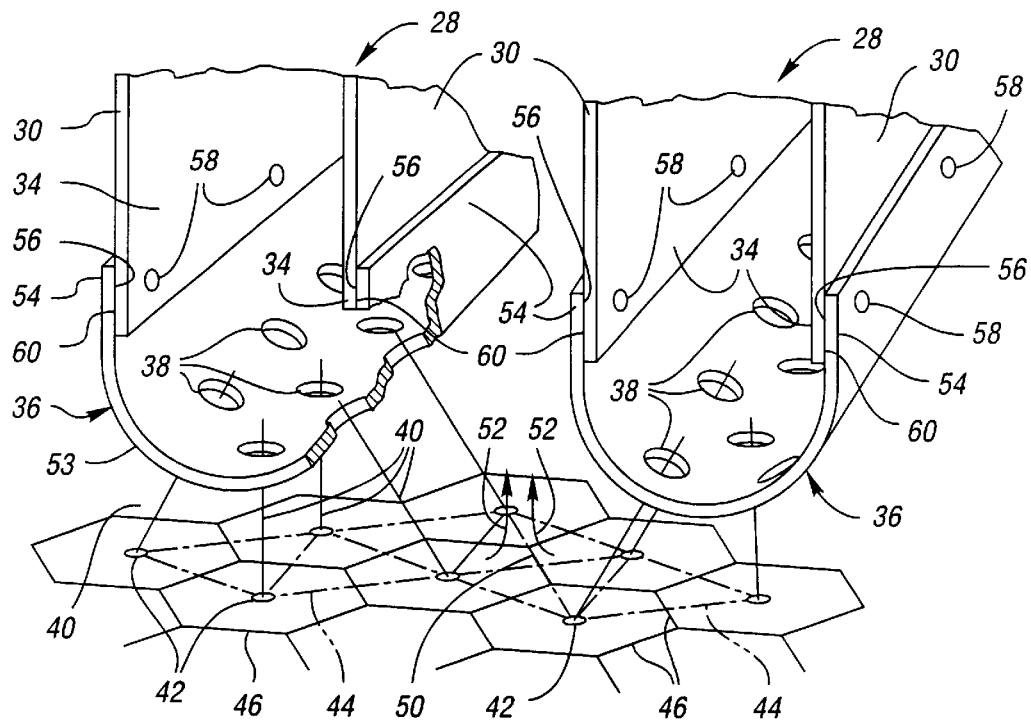
FIG. 4 is a perspective view that illustrates the manner in which the nozzle feed rows of the quench units provide quench gas jets that define an equilateral triangular gas jet impingement pattern providing uniformly sized equilateral hexagonal quench cells of a formed glass sheet to be quenched.

With reference to FIG. 2, each quench unit 22 includes a plenum housing 24 defining a quench plenum 26 to which pressurized gas is supplied from a blower in a conventional manner. Each quench unit 22 also includes a plurality of nozzle feed rows 28 extending from its plenum housing 24 in a spaced relationship from each other. Each of the nozzle feed rows is fabricated from sheet metal as illustrated in FIG. 4 and has a pair of generally planar sides 30. The planar sides 30 of the nozzle feed rows 28 have inner extremities 32 mounted as shown in FIG. 2 by the plenum housing 24 and also have distal extremities 34 with curved shapes along a longitudinal axis A as shown in FIG. 3. Each nozzle feed row 28 has an elongated curved nozzle cap 36 that is curved in a direction along the longitudinal axis A and is secured to the curved distal extremities 34 of the planar sides of the associated nozzle feed row. The curved nozzle cap 36 of each nozzle feed row has a curved cross section along its length perpendicular to the longitudinal axis A and nozzle openings 38 for providing quench gas jets 40 that, as shown in FIG. 4, impinge with the formed glass sheet G being quenched at locations 42 and define a uniformly repeating gas jet impingement pattern that provides uniformly repeating quench cells, specifically an equilateral triangular gas jet impingement pattern 44 that provides uniformly sized equilateral hexagonal quench cells 46 distributed over the formed glass sheet to be quenched. The locations 42 of gas jet impingement are thus spaced the same distance from each other and define the hexagonal quench cells 46 with substantially the same size as each other although the cells on the opposite surfaces of the glass sheet may have slightly different sizes due to the thickness of the curved glass sheet. More specifically, the impingement locations 42 may be selected on either surface or the midplane therebetween when the glass sheet is flat, and actually any other intermediate plane may also be used. Forming of the glass sheet maintains the impingement locations 42 equally spaced from each other on the selected surface, midplane, or other intermediate plane; however, the curvature of the formed glass sheet will result in just slightly different but yet substantially equal spacing between the impingement locations 42 on the concave and convex surfaces. Furthermore, it should be noted that slight variations, such as for example those caused by stretching of the glass sheet during the forming, can result in slightly different spacings of the impingement locations 42 and resultant slight variations in the uniformly repeating quench cells that provide the uniform quenching and consequent substantially uniform stresses over the entire extents of both formed surfaces of the formed glass sheet.

Figure 10:
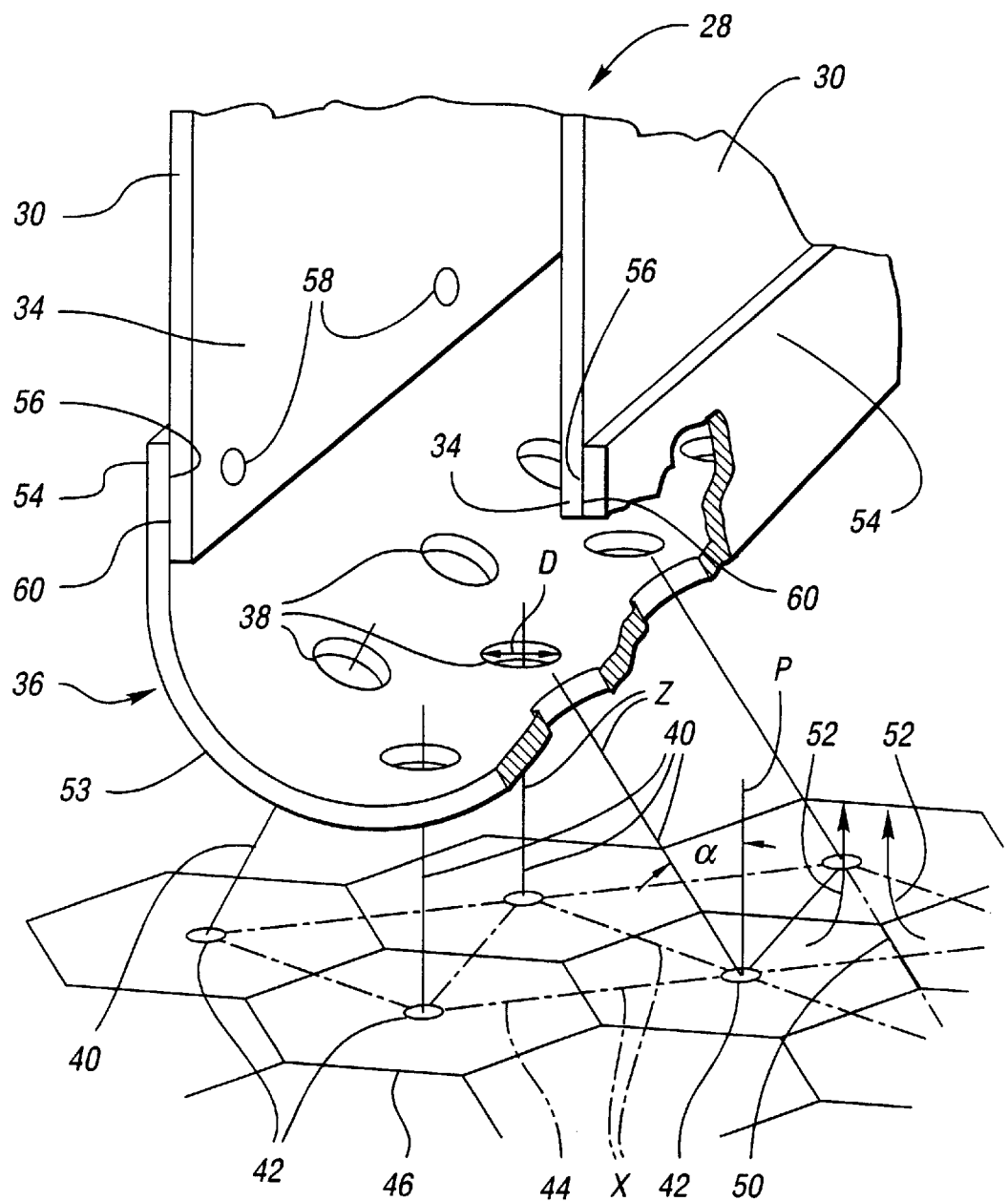
FIG. 10 is a perspective view similar to FIG. 4 to further illustrate how the formed glass sheet quenching is performed.

With the foregoing in mind and reference to FIG. 10, the amount of cooling provided by each quench gas jet 40 depends upon: (1) the size of its associated nozzle opening 38 which is controlled by the diameter D when of the round shape illustrated; (2) the distance Z of the gas jet 40 between the nozzle opening 38 and the location 42 of impingement with the glass sheet; and (3) the angle $\alpha$ between the gas jet 40 and a perpendicular P to the formed glass sheet at the location of impingement 42 of the quenched gas jet 40. In order to provide efficient cooling, these parameters are governed by the formula:

$$Z/D \leq 6 \text{ cosine } \alpha$$

Furthermore, the angle a is preferably less than about 45° since significant heat transfer loss occurs at greater angles. In addition, the length Z of each quench gas jet 40 is preferably less than the spacing X between the locations of impingement 42.

With reference to FIG. 2, each plenum housing 24 preferably has a V shape that is secured to the inner extremities 32 of the planar sides 30 of the nozzle feed rows 28. Both the plenum housing 24 and the nozzle feed rows 28 are preferably fabricated from sheet metal and the securement thereof to each other is conventionally provided by a welding operation although other types of securement and fabrication are also possible.

Figure 5:
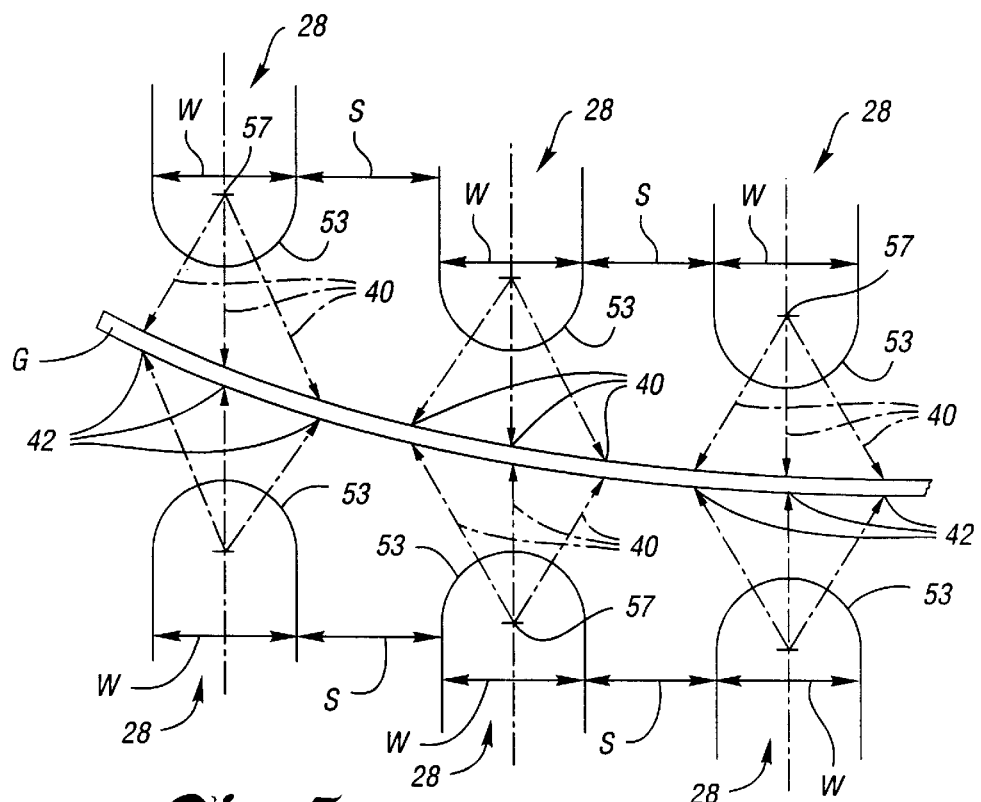
FIG. 5 is a sectional view taken along the direction of line 5—5 in FIG. 2 and illustrating the nozzle feed rows of the quench units having a uniform spacing from each other.

With reference to FIG. 5, one embodiment of the quench station 20 has the nozzle feed rows 28 provided with uniform widths W and uniform spacings S from each other. This construction provides a uniform area between the nozzle feed rows 28 for escape of spent quenching gas after the impingement with the formed glass sheet. However, the gas jets 40 will not have substantially equal lengths and substantially equal angles of incidence at aligned locations of impingement at the oppositely facing formed surfaces of the glass sheet being quenched.

Figure 6:
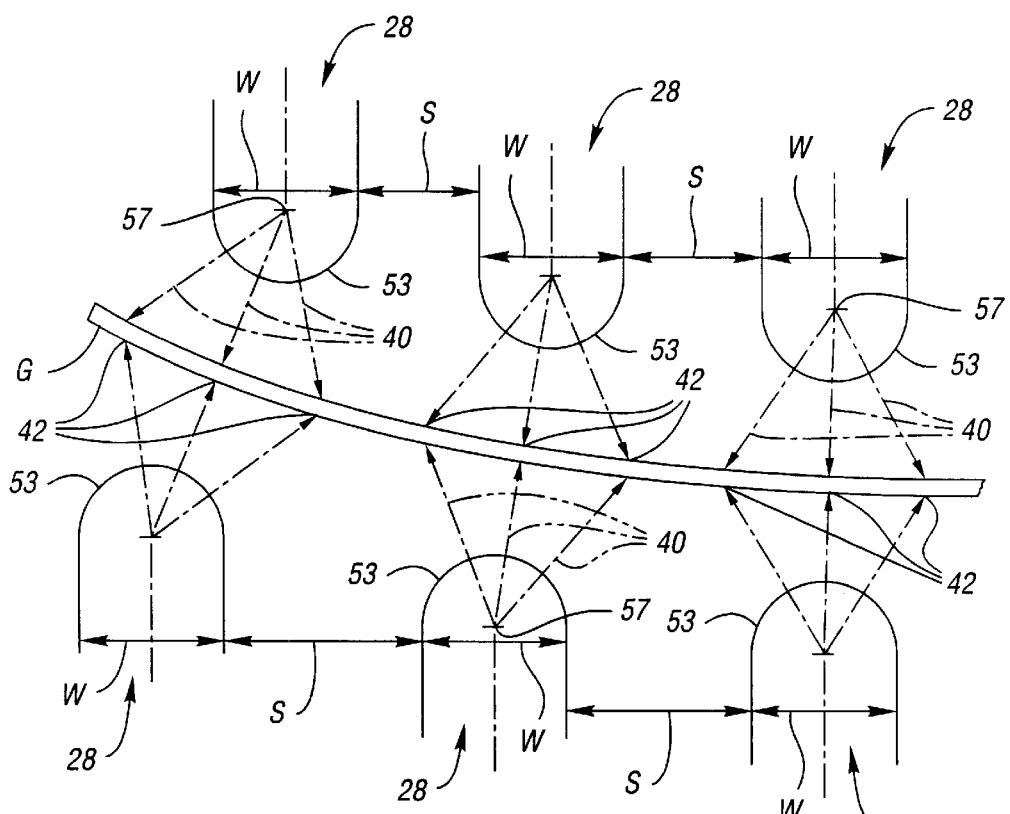
FIG. 6 is a view similar to FIG. 5 but with the nozzle feed rows having a varying spacing from each other.

With reference to FIG. 6, another embodiment of the quench station has the nozzle feed rows 28 also provided with uniform widths W but has varying spacings S from each other. This embodiment allows the gas jets 40 to have substantially equal lengths and substantially equal angles of incidence at aligned locations of impingement at oppositely facing formed surfaces of the glass sheet being quenched. However, the escape areas for spent quenching gas after impingement with the formed glass sheet will not be uniform as illustrated by arrows S.

With reference to FIG. 4, it is desirable for each quench unit to have the total area of escape for spent quenching gas between its nozzle feed rows 28 to be at least six times the area of its nozzle openings 38.

As illustrated in FIG. 4, the gas jets at the boundaries of the hexagonal quench cells 46 meet and create linear stagnation regions 50 from which a curtain jet 52 of spent quenching gas flows away from the glass sheet in a perpendicular relationship. Thus, each gas jet 40 impinging with the glass sheet is surrounded by a curtain jet 52 that flows away from the glass sheet, and each curtain jet is continuous as long as the neighboring quench gas jets continue to flow. The curtain jets flow away from the glass sheet until being forced to flow between the nozzle feed rows.

It will be noted that both the embodiment of FIG. 5 and the embodiment of the FIG. 6 have the nozzle feed rows 28 provided with varying heights from one row to the next row to provide quenching of glass sheets that are formed with curvature in transverse directions, in other words, curvature of the glass sheet along the lengths of the nozzle feed rows as well as curvature from one nozzle feed row to the next. It is also possible for the nozzle feed rows 28 to have the same height as each other when the formed glass sheet is curved in only one direction along the curved lengths of the nozzle feed rows.

Normally, the quenching will be provided with the formed glass sheets supported by a quench ring at its periphery in a conventional manner.

It will also be noted that with both the embodiments of FIGS. 5 and 6, the quench gas jets 40 have impingement locations that are substantially aligned with each other.

As illustrated in FIG. 4, the curved cross section of the nozzle cap 36 of each nozzle feed row has semicircular shape 53 and projections 54 that are respectively secured to the distal extremities 34 of the planar sides 30 of the associated nozzle feed row. More specifically, these projections 54 preferably have inner surfaces 56 that oppose each other and are respectively secured to the distal extremities 34 of the planar sides 30 of the nozzle feed rows. With this construction, the edges of the projections 54 face away from the formed glass sheet so that the spent quenching gas does not flow into these edges and thereby cause any turbulence in the flow away from the formed glass sheet.

As shown in FIGS. 5 and 6, the gas jets 40 flow from the semicircular shape 53 of the curved nozzle cap aligned with its center of curvature 57.

With reference to FIG. 4, each nozzle feed row 28 includes connections having alignment fasteners 58 such as rivets that secure the projections 54 of the curved nozzle caps 36 to the distal extremities 34 of the planar sides 30 of the nozzle feed rows. In addition, the connections include an adhesive 60 that also secures the projections 54 of the curved nozzle caps 36 to the distal extremities 34 of the planar sides 30 of the nozzle feed rows. The connections provided by the alignment fasteners 58 ensure that the nozzle openings 38 are located at the proper location for providing the equilateral triangular gas jet impingement pattern as previously discussed, while the adhesive 60 ensures that there is complete sealing along the entire lengths of the projections 54.

As is apparent from the preceding discussion, the quench station 20 illustrated in FIG. 1 has its pair of quench units 22 located at upper and lower locations such that the formed glass sheet is positioned between the upper and lower quench units for the quenching. Thus, the quench gas jets are distributed from the curved nozzle caps 36 of the pair of quench units for impingement as previously described. This quenching as previously discussed can be performed on a formed glass sheet that is curved in transverse directions by provision of nozzle feed rows 28 with different heights from one nozzle feed row to the next as well as having curvature along the length of each nozzle feed row.

As is also apparent from the preceding description, the resultant formed and quenched glass sheet G of this invention has oppositely facing formed surfaces that are curved rather than being planar as is the case with flat glass sheets. Between these formed surfaces, the glass stresses provided by the quenching are uniformly distributed both along and perpendicular to the direction of curvature due to the manner in which the glass sheet is quenched with the gas jets 40 that define a uniformly repeating impingement pattern that provides uniformly repeating quench cells 46 distributed over the glass sheet. More specifically, the formed and quenched glass sheet G preferably has the glass stresses between its surfaces uniformly distributed by quenching the glass sheet with the gas jets 40 defining an equilateral triangular impingement pattern 44 that provides uniformly sized equilateral hexagonal quench cells 46.

Figure 7:
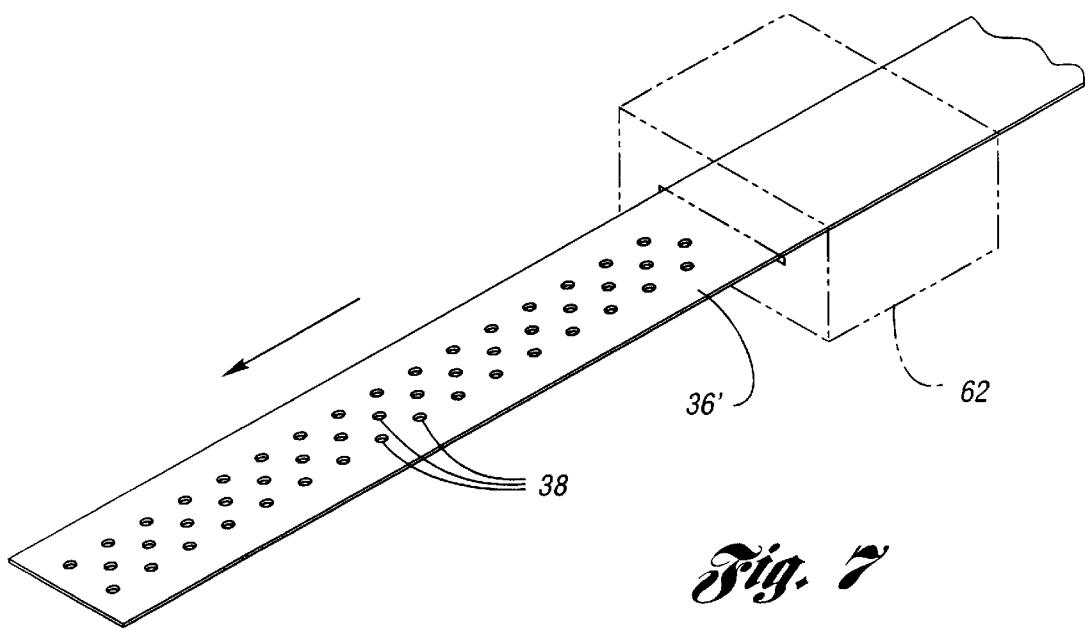
FIG. 7 is a perspective view that illustrates the manner in which nozzle openings are formed in a nozzle strip during fabrication of the quench units.
Figure 8:
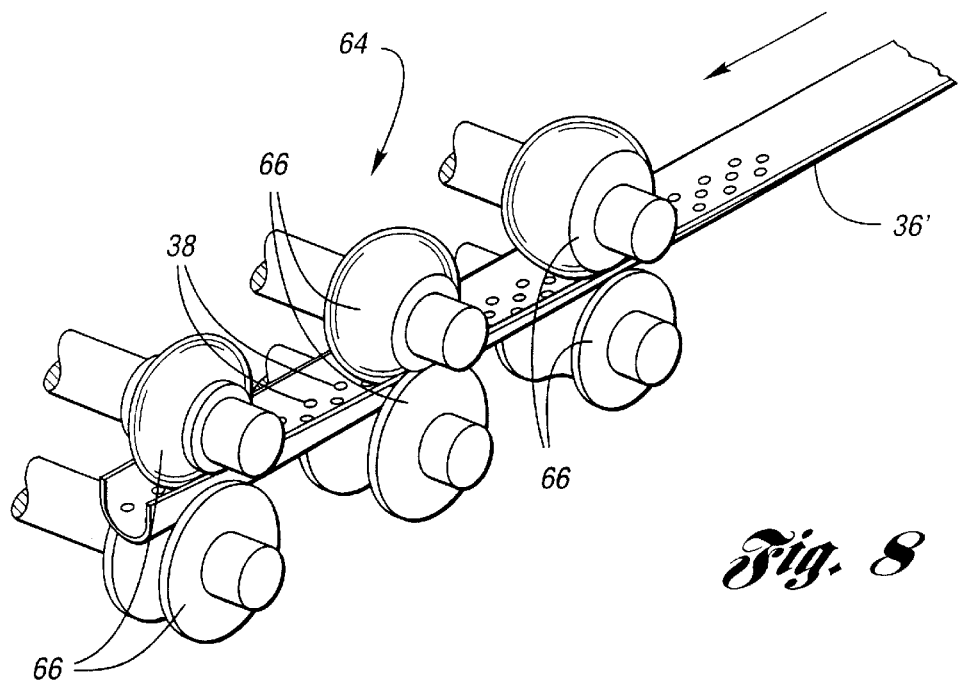
FIG. 8 is a perspective view that illustrates the manner in which a semicircular cross section of the nozzle strip is formed after forming the nozzle openings.
Figure 9:
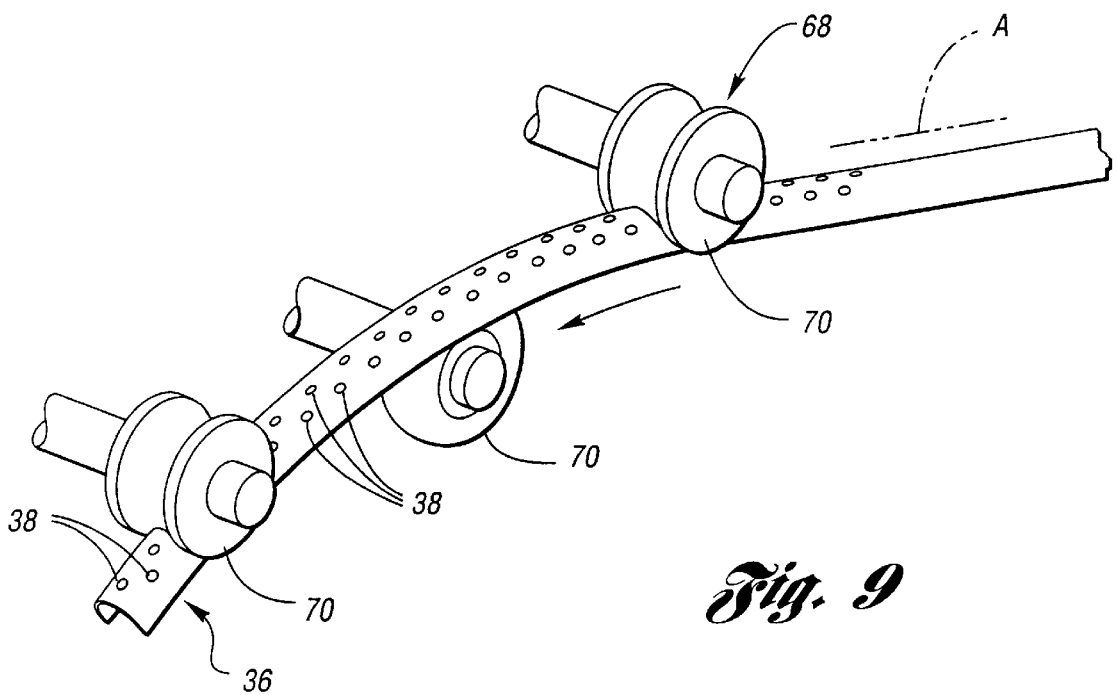
FIG. 9 is a perspective view illustrating the manner in which the elongated shape of the nozzle strip is curved to provide a curved nozzle cap utilized in the fabrication of the nozzle feed rows.

The invention also relates to the method for making the quench units 22 as previously described. More specifically as illustrated in FIG. 7, this method is performed by initially forming the nozzle openings 38 in a predetermined pattern with predetermined sizes in a nozzle strip 36' of an elongated shape with the nozzle opening formation preferably provided by conventional punching apparatus 62 that is schematically illustrated and preferably with the nozzle openings having round shapes. Thereafter, as illustrated in FIG. 8, the nozzle strip 36' is formed along the longitudinal axis A along its elongated length with a curved cross section perpendicular to the longitudinal axis A with this forming as shown provided by roll apparatus 64 including opposed pairs of rolls 66 that provide the nozzle cap cross section previously described. Such forming may slightly but not significantly distort the round shape of the nozzle openings. After forming of the curved cross section, the nozzle strip 36' as illustrated in FIG. 9 is formed with a curved shaped in a direction along the longitudinal axis A to provide the curved nozzle cap 36 as previously described. This forming of the curved shape along the length of the nozzle cap 36 is shown as being performed by roll apparatus 68 including spaced rolls 70 appropriately positioned to provide the required curvature. The nozzle cap 36 is then secured to the curved distal extremities of the planar sides 30 of the nozzle feed row 28 as previously described in connection with FIG. 4.

While the best mode for carrying out the invention have been described in detail, those familiar with the art to which this invention relates will recognize various alternative constructions and embodiments for practicing the invention as defined by the following claims:

What is claimed is:

1. A glass sheet quench unit for quenching formed glass sheets, comprising:
a plenum housing defining a quench plenum to which pressurized gas is supplied; and
a plurality of nozzle feed rows extending from the plenum housing in a spaced relationship from each other, each nozzle feed row having a pair of generally planar sides, the planar sides of the nozzle feed rows having inner extremities mounted by the plenum housing and also having distal extremities with curved shapes along a longitudinal axis, each nozzle feed row having an elongated nozzle cap that is curved in a direction along the longitudinal axis and is secured to the curved distal extremities of its planar sides, and the nozzle cap of each nozzle feed row having a curved cross section along its length perpendicular to the longitudinal axis and having nozzle openings for providing quench gas jets that define a uniformly repeating gas jet impingement pattern providing uniformly repeating quench cells distributed over a formed glass sheet to be quenched to provide uniform quenching.

2. A glass sheet quench unit as in claim 1 wherein the nozzle openings provide gas jets that define an equilateral triangular gas jet impingement pattern providing uniformly sized equilateral hexagonal quench cells distributed over the formed glass sheet to be quenched.

3. A glass sheet quench unit as in claim 1 wherein the plenum housing has a V shape that is secured to the inner extremities of the planar sides of the nozzle feed rows.

4. A glass sheet quench unit as in claim 1 wherein the nozzle feed rows have uniform widths and uniform spacings from each other.

5. A glass sheet quench unit as in claim 1 wherein the nozzle feed rows have uniform widths and varying spacings from each other.

6. A glass sheet quench unit as in claim 1 wherein the nozzle feed rows have varying heights from one row to the next row to provide quenching of glass sheets that are formed with curvature in transverse directions.

7. A glass sheet quench unit as in claim 1 wherein the curved cross section of the nozzle cap of each nozzle feed row has a semicircular shape and projections that extend from its semicircular shape and that are respectively secured to the distal extremities of the planar sides of the nozzle feed row.

8. A glass sheet quench unit as in claim 7 wherein the projections of the curved nozzle caps have inner surfaces that oppose each other and are respectively secured to the distal extremities of the planar sides of the nozzle feed rows.

9. A glass sheet quench unit as in claim 7 wherein each nozzle feed row includes connections having alignment fasteners that secure the projections of the curved nozzle caps to the distal extremities of the planar sides of the nozzle feed rows.

10. A glass sheet quench unit as in claim 9 wherein the connections that secure the projections of the curved nozzle caps to the distal extremities of the planar sides of the nozzle feed rows also include an adhesive.

11. A glass sheet quench unit for quenching formed glass sheets, comprising:
a plenum housing of a V shape defining a quench plenum to which pressurized gas is supplied; and
a plurality of nozzle feed rows extending from the plenum housing in a spaced relationship from each other, each nozzle feed row having a pair of generally planar sides, the planar sides of the nozzle feed rows having inner extremities mounted by the plenum housing and also having distal extremities with curved shapes along a longitudinal axis, each nozzle feed row having an elongated nozzle cap that is curved in a direction along the longitudinal axis and has a semicircular cross section perpendicular to the longitudinal axis including projections that are secured to the curved distal extremities of the planar sides of the feed row, and the nozzle cap of each nozzle feed row having nozzle openings for providing quench gas jets that define an equilateral triangular gas jet impingement pattern providing uniformly sized hexagonal quench cells distributed over a formed glass sheet to be quenched to provide uniform quenching.

12. A glass sheet quench unit for quenching formed glass sheets, comprising:

a plenum housing of a V shape defining a quench plenum to which pressurized gas is supplied; and a plurality of nozzle feed rows extending from the plenum housing in a spaced relationship from each other, each nozzle feed row having a pair of generally planar sides, the planar sides of the nozzle feed rows having inner extremities mounted by the plenum housing and also having distal extremities with curved shapes along a longitudinal axis, each nozzle feed row having an elongated nozzle cap that is curved in a direction along the longitudinal axis and has a semicircular cross section perpendicular to the longitudinal axis including projections having inner surfaces with alignment fasteners and adhesive connections to the curved distal extremities of the planar sides of the feed row, and the nozzle cap of each nozzle feed row having nozzle openings for providing quench gas jets that define an equilateral triangular gas jet impingement pattern providing uniformly sized hexagonal quench cells distributed over a formed glass sheet to be quenched to provide uniform quenching.

13. A glass sheet quench station including a pair of quench units that oppose each other to quench formed glass sheets, comprising:

each quench unit including a plenum housing defining a quench plenum to which pressurized gas is supplied;

each quench unit including a plurality of nozzle feed rows extending from the plenum housing in a spaced relationship from each other, each nozzle feed row having a pair of generally planar sides, the planar sides of the nozzle feed rows having inner extremities mounted by the plenum housing and also having distal extremities with curved shapes along a longitudinal axis, each nozzle feed row having an elongated nozzle cap that is curved in a direction along the longitudinal axis and is secured to the curved distal extremities of its planar sides, and the nozzle cap of each nozzle feed row having a curved cross section perpendicular to the longitudinal axis and nozzle openings for providing quench gas jets that define an equilateral triangular gas jet impingement pattern providing uniformly sized equilateral hexagonal quench cells distributed over a formed glass sheet to be quenched to provide uniform quenching; and the equilateral triangular gas jet impingement pattern and the hexagonal quench cells provided by both quench units being aligned with each other.

14. A method for quenching formed glass sheets comprising:

positioning a glass sheet, that has been formed from a flat shape to a curved shape along an axis, between a pair of gas quench units of a quench station with the gas quench units curved along said axis; and distributing gas jets from the pair of quench units for impingement with the formed glass sheet in a uniformly repeating pattern providing uniformly repeating quench cells distributed both along and perpendicular to said axis over the formed glass sheet to provide uniform quenching.

15. A method for quenching formed glass sheets as in claim 14 wherein the gas jets are distributed over the formed glass sheet in an equilateral triangular pattern providing uniformly sized equilateral hexagonal quench cells.

16. A formed glass sheet quenching method as in claim 15 wherein the gas jets are distributed from quench units having nozzle feed rows spaced uniformly from each other.

17. A formed glass sheet quenching method as in claim 15 wherein the gas jets are distributed from quench units having nozzle feed rows spaced at varying distances from each other.

18. A formed glass sheet quenching method as in claim 15 wherein the pair of quench units of the quench station are positioned in upper and lower locations relative to each other with the formed glass sheet located therebetween for the quenching in the equilateral triangular gas jet impingement patterns providing the uniformly sized hexagonal quench cells.

19. A formed glass sheet quench method as in claim 18 wherein the equilateral triangular gas jet impingement patterns and the uniformly sized hexagonal quench cells provided by the quench units at the upper and lower locations are aligned with each other.

20. A formed glass sheet quench method as in claim 15 wherein the formed glass sheet positioned between the pair of quench units of the quench station is curved in transverse directions, and the pair of quench units distributing gas jets for impingement in the equilateral triangular patterns providing the uniformly sized hexagonal quench cells distributed over the transversely curved shape of the formed glass sheet.

21. A formed glass sheet quench method as in claim 15 wherein the gas jets are distributed from the pair of quench units through curved nozzle caps of elongated shapes having curved cross sections and curved shapes along their lengths.

22. A formed glass sheet quenching method, comprising:

positioning a glass sheet, that has been formed from a flat shape to a curved shape along an axis, between a pair of upper and lower quench units of a quench station with the gas quench units curved along said axis; and distributing gas quench jets from curved nozzle caps of the pair of quench units for impingement with the formed glass sheet in equilateral triangular patterns providing uniformly sized hexagonal quench cells distributed both along and perpendicular to said axis over the formed glass sheet to provide uniform quenching and with the equilateral triangular patterns and uniformly sized equilateral hexagonal quench cells provided by each quench unit being aligned with those of the other.

23. A formed glass sheet quench method as in claim 22 wherein the formed glass sheet positioned between the pair of quench units of the quench station is curved in transverse directions, and the pair of quench units distributing gas quench jets for impingement in the equilateral triangular patterns providing the uniformly sized equilateral hexagonal quench cells distributed over the transversely curved shape of the formed glass sheet.

24. A glass sheet that has been formed from a flat shape to a curved shape along an axis and then quenched comprising:

oppositely facing formed surfaces between which glass stresses are uniformly distributed both along and perpendicular to said axis by quenching the glass sheet with gas jets that define a uniformly repeating impingement pattern that provides uniformly repeating quench cells distributed both along and perpendicular to said axis over the glass sheet.

25. A formed and quenched glass sheet as in claim 24 wherein the glass stresses between the oppositely facing formed surfaces are uniformly distributed both along and perpendicular to said axis by quenching the glass sheet with gas jets that define an equilateral triangular impingement pattern that provides uniformly sized equilateral hexagonal quench cells distributed both along and perpendicular to said axis over the glass sheet.

26. A method for making a quench unit for quenching formed glass sheets, comprising:

initially forming nozzle openings in a predetermined pattern with predetermined sizes in a nozzle strip of an elongated length along a longitudinal axis;

thereafter forming the nozzle strip along its elongated length with a curved cross section perpendicular to the longitudinal axis;

thereafter forming the nozzle strip with a curved shape in a direction along the longitudinal axis to provide a curved nozzle cap;

subsequently securing the curved nozzle cap to distal extremities of planar sides of a nozzle feed row with the distal extremities having curved shapes along said longitudinal axis; and finally securing the sides of the nozzle feed row to a plenum housing.

27. A method for making a quench unit as in claim 26 wherein the nozzle openings are punched in the nozzle strip.

28. A method for making a quench unit as in claim 26 wherein the nozzle strip is roll formed with a curved cross section along its elongated length.

29. A method for making a quench unit as in claim 26 wherein the nozzle strip is roll formed with the curved shape in a direction along its elongated length.

30. A method for making a quench unit as in claim 26 wherein the curved cross section of the nozzle strip is formed with a semicircular shape and projections that extend from its semicircular shape and that are secured to the curved distal extremities of the planar sides of the nozzle feed row.

31. A method for making a quench unit as in claim 26 wherein alignment fasteners and an adhesive secure inner surfaces of the projections of the curved nozzle cap to the planar sides of the nozzle feed row.

32. A method for making a quench unit for quenching formed glass sheets, comprising:

punching nozzle openings in a predetermined pattern with predetermined sizes in a nozzle strip of an elongated length along a longitudinal axis;

thereafter roll forming the nozzle strip along its elongated length with projections and with a semicircular cross section perpendicular to the longitudinal axis;

thereafter roll forming the nozzle strip with a curved shape in a direction along the longitudinal axis to provide a curved nozzle cap;

subsequently securing with alignment fasteners and an adhesive inner surfaces of the projections of the curved nozzle cap to distal extremities of planar sides of a nozzle feed row with the distal extremities having curved shapes along said longitudinal axis; and finally securing the sides of the nozzle feed row to a V-shaped plenum housing.

\* \* \* \* \*